United States Patent [19]
Leiber

[11] Patent Number: 4,624,108
[45] Date of Patent: Nov. 25, 1986

[54] HYDRAULIC BRAKE BOOSTER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 675,043

[22] Filed: Nov. 26, 1984

[30] Foreign Application Priority Data

Mar. 14, 1984 [DE] Fed. Rep. of Germany ....... 3409290

[51] Int. Cl.$^4$ ............................................. B60T 13/20
[52] U.S. Cl. .................................. 60/550; 60/551; 60/534; 60/552; 60/581; 60/591
[58] Field of Search ............ 60/547.1, 548, 534, 60/535, 545, 591, 550, 551, 552, 581, 582

[56] References Cited

U.S. PATENT DOCUMENTS

| 4,143,514 | 3/1979 | Leiber | 60/534 |
| 4,285,199 | 8/1981 | Leiber | 60/545 |
| 4,405,183 | 9/1983 | Resch | 60/591 |
| 4,434,619 | 3/1984 | Kobayashi | 60/577 |

FOREIGN PATENT DOCUMENTS 2825087 12/1979 Fed. Rep. of Germany.
3237959 5/1983 Fed. Rep. of Germany.

Primary Examiner—Abraham Hershkovitz
Attorney, Agent, or Firm—Edwin E. Greigg

[57] ABSTRACT

A hydraulic brake booster including main cylinders operative relative to a pedal stroke by which a sufficient pedal stroke is still available in the event of a failure in the pressure supply so that the brakes can be actuated by the pedal stroke and furthermore flooring of the brake pedal is avoided in the event of failure of the fluid medium power supply.

21 Claims, 4 Drawing Figures 4,624,108

HYDRAULIC BRAKE BOOSTER

BACKGROUND OF THE INVENTION

The invention is based on a brake booster. A brake booster of this kind is known (German Offenlegungsschrift No. 28 25 087).

A brake booster of this kind is equipped with an integrated anti-skid system, so that the brake booster has a dual function, that is, boosting braking action and modulating pressure for the anti-skid system. To modulate pressure, a separate valve circuit is used together with a special type of brake booster, in which the main cylinder is used for pressure modulation.

However, other systems are also known, which operate according to the principle of direct feeding of pressure from the pressure supply means (German Offenlegungsschrift No. 32 37 959).

These known types have devices with which, if the pressure supply means fails, the piston of the main cylinder is retained in a specific position, so that a safety range for operation of the piston stroke is still available.

OBJECT AND SUMMARY OF THE INVENTION

The brake booster mentioned at the outset has the advantage over the prior art that in the event of a failure of the pressure supply means, the main cylinder is pressed via a spring force into an outset position from whence the brake is fully functional, without auxiliary force. The brake booster is inherently safe in its basic design. A further advantage is that in the event of failure flooring of the brake pedal is avoided; in other words, the pedal characteristic can be considered steady in every instance.

Further advantages of the invention are attained in accordance with the characteristics set forth herein. For instance, providing shock absorption for the reservoir pressure operating piston enables the additional stroke of this piston to be used for actuating switches with which low reservoir pressure can be indicated and the reservoir can be discharged.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
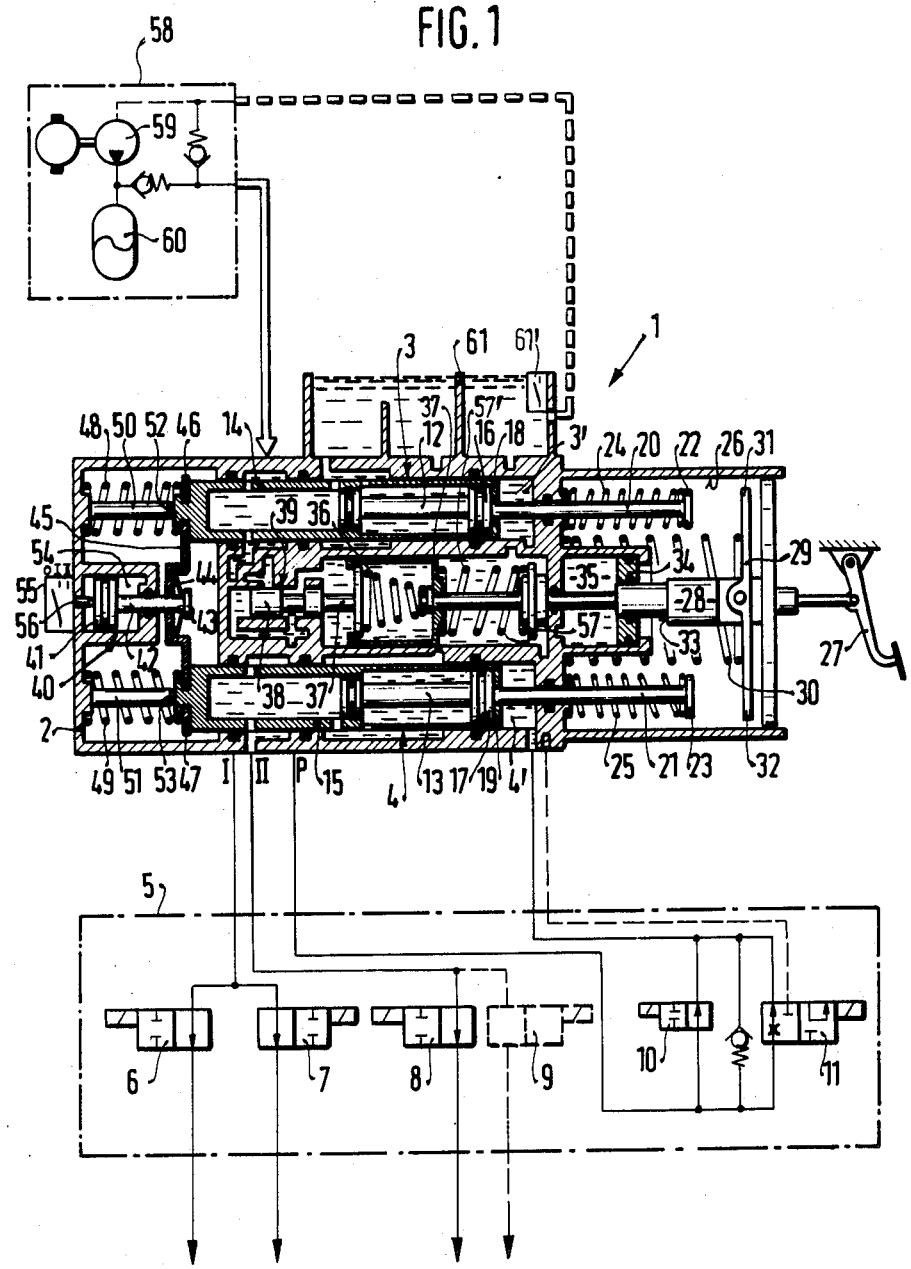
FIG. 1 shows a hydraulic brake booster with a twin embodiment of the main cylinder and two closed brake circuits.

A brake booster 1 has a housing 2, in which two main brake cylinders 3 and 4 are disposed parallel to and spaced from one another; accordingly, this is a so-called "twin" embodiment. Associated with the brake booster 1 is an anti-skid system 5 having a valve block, which has individual regulating valves 6, 7, 8, 9, 10 and 11 for preventing skidding and through which pressure is supplied to the brake cylinders.

The main brake cylinders 3 and 4 are each equipped with a respective main cylinder piston 12 and 13 and a respective sleeve 14 and 15 receiving the pistons 12 and 13. The sleeves 14 and 15 are axially movable with a certain stroke in the housing 2 and they have radial openings in the vicinity of housing recesses, which remain in communication with the housing recesses over the entire course of the stroke of the sleeves 14 and 15. The sleeves also are provided with radial openings that connect the sleeves respectively to the brake control lines I and II. A posterior end 16 and 17 of each piston 12 and 13 is located at a radial end wall 18 and 19 of each sleeve 14 and 15 and includes a respective rod 20 and 21, extending in a direction toward a brake pedal 27, which is provided with a head 22 and 23 and a restoring spring 24 and 25 acting upon the head 22 and 23 at one end and the housing at the opposite end. The rods 20 and 21 are not sealed with respect to end walls 18 and 19 of the sleeves 14 and 15; therefore, fluid in chambers 3' and 4' behind sleeves 14 and 15 can enter the sleeves behind pistons 16 and 17.

The rod 20 and 21, head 22 and 23 and spring 24 and 25 are located in a housing recess 26 formed by a housing extension, into which a pedal tappet 28 connected to a brake pedal 27 protrudes. An actuation plate 29 is articulated on the pedal tappet 28 and is subjected to the force of a spring 30; ends 31 and 32 of the actuation plate are intended for cooperation with the rod heads 22 and 23 which will contact pistons 16 and 17 if the pressure supply system fails.

The pedal tappet 28 has a shoulder 33, which usually is spaced from an annular piston 34 by a certain distance. This annular piston 34, in the form of a movable wall, defines a work chamber 35, which is connected to the pump pressure and subjected to the pressure exerted during braking by a control valve 39. A travel-limiting spring 36 is also inserted, as a travel simulator, between one end of the tappet 28 and a piston 37 which is held within a cylinder 37' which is movable on tappet 28 and surrounded by intermediate spring 57 positioned between cylinder 37' and a spring holder 57 secured to tappet 28. The travel simulator is combined with intermediate spring 57', which transmits the pedal force to the travel simulator. This intermediate spring 57 is provided for safety reasons, so that for instance if the travel simulator is blocked, the pedal movement can be transmitted to the pistons of the main cylinders directly. One end 37 of the tappet, via the travel simulator 36, actuates a slide 38, which together with radial bore outlets in the housing 2 embodies the brake booster control valve 39 which controls fluid under pressure from a pressure supply apparatus 58.

When the pedal is unactuated, the flow of pressure medium from the pressure supply unit 58 to the booster in the control valve 39 is blocked, and the sleeves 14 and 15 are subject to the force of the spring 48 and 49 in a right-hand end position, not shown. Upon braking, the pedal 27 is actuated, and via the coaxially arranged tappet the control valve 39 is shifted out of its neutral position over into the braking position.

On the side of the brake booster 1 remote from the brake pedal 27, a work cylinder 40 is provided in the housing 2 for forming a reservoir for a reservoir pressure operating piston 41. The pressure operating piston 41 includes a rod 42, which protrudes from the work cylinder 40 and is provided with a head 43 and an intermediate spring 44 mounted beneath the head 43. The head 43 and the intermediate spring 44 are supported on a crosspiece 45, that includes two ends 46 and 47 which are firmly joined to the sheaths 14 and 15 of the main cylinders 3 and 4. In the vicinity of the ends 46 and 47 on the cross piece 45, restoring springs 48 and 49 are provided, which tend to press the sleeves 14 and 15 in the direction toward the brake pedal 27.

The two stop pins 50 and 51 are disposed in the housing, centrally surrounded by the compression springs 48 and 49, and their free ends 52 and 53 usually rest on the ends of sleeves 14 and 15 to which crosspiece ends 46 and 47 are firmly joined. Booster pressure work chambers 3' and 4' located at the brake pedal ends of the sleeves 14 and 15 in the main cylinders 3 and 4 and defined by the primary parts of the main cylinder pistons 12 and 13 are connected to the pressure supply apparatus 58 by movement of pedal 27 which moves valve 39 to open passages to line P. The fluid in line P passes freely through open valve 10 to the work chamber 3' and 4' to force the sleeves 14 and 15 to their maximum movement toward stop pins 50 and 52.

The crosspiece 45 is retained in this position by the reservoir pressure, which is usually effective in a work chamber 54 to the right of the reservoir pressure operating piston 41, as shown and by pressure work chamber 3', 4'. A switch 55 having three switching positions O, I and II is disposed behind or to the left of the operating piston 41 and by use of switching pin 56, the switch 55 senses the position in which the operating piston 41 is located.

A pressure supply apparatus 58 includes a motor-driven pump 59, a reservoir 60 and a fluid reservoir, which is formed by a multiple-chamber refill container 61. The fill level of the refill chamber is monitored by a level switch 61' shown in the right hand chamber of the refill chamber.

MODE OF OPERATION

During conventional braking, the foot pedal is pressed which moves the slide 38 of the control valve 39 to uncover fluid pressure bores in the housing and pressure from the pressure supply apparatus 58 travels via openings in valve 39 out through connecting line P, through open valve 10 to the booster pressure work chamber 3' and 4' behind the sleeves 14 and 15 and into the sleeves 14 and 15 along piston rods 20 and 21 behind pistons 16 and 17. These pistons move toward the left and force the supply pressure medium from the sleeves through bores therein to the brake circuits I and II for braking. The braking pressure provided is also effective in the work chamber 35 between piston 34 and the wall of housing 2, while the pressure of the pressure supply apparatus 58 still prevails as before in the work chamber 54 of work cylinder 40. As a result, the crosspiece 45 remains in contact with the stop pins 50 and 51. The stroke of the pedal tappet 28 in the brake actuation direction is terminated whenever the control valve 39 has connected the bores and outlets with the pressure elements. The shoulder 33 then rests on the annular piston 34; accordingly, it serves as a stroke limiter when maximal brake pressure has been exerted. If the effective braking pressure in the following brake cylinders is so high that there is a danger of skidding, or wheel lock, then the anti-skid system 5 begins its work: The valves 6-10 prevent a further rise in braking pressure, and the valve 11 relieves the brake booster on the primary side via pressure line P which is also connected to normally closed valve 11.

If the energy supply provided by the pressure supply apparatus 58 fails, then no further pressure is exerted upon the annular piston 34 from chamber 35; the result is that the pedal tappet 28 would be able to move farther into the housing 2 of the brake booster 1, and the actuation plate 29 would rest against the heads 22, 23 of the rods 20 and 21 which actuates the pistons 12 and 13 of the main cylinders 3 and 4 directly by means of the brake pedal 27 to generate braking pressure.

Movement of the master cylinders 12 and 13 closes connections between the refill container 61 and the master cylinders so that the pressure medium in the master cylinders 12 and 13 will then be forced through line I and II to the brakes via the anti-skid valves. Then, however, the pedal 27 would drop to the floor, and the pedal characteristic would vary.

Simultaneously with the pressure drop in the chamber 35, the pressure in the work chamber 54 of the reservoir pressure operating piston 41 also drops. The force of the pre-stressed restoring springs 48 and 49 now predominates and displaces the crosspiece 45, together with the sleeves 14 and 15, toward the brake pedal 27, in this manner, flooring of the brake pedal 27 is avoided, and the pedal characteristic is preserved.

Since the operating piston 41 is also supported with respect to the crosspiece 45 via the intermediate spring 44, the operating piston 41 can also be used for actuating the switch 55. In its switching positions I and II, which it attains at approximately 140 and 100 bar respectively, a warning device is switched on, and the motor of the pump 59 is turned on. Contrarily, the sleeves 14 and 15 are pushed back only at a residual pressure of 60 bar by the springs 48 and 49.

It should be noted that in the event of failure of the pressure supply, the main cylinder pistons 12 and 13 are moved by the restoring springs 48 and 49 into the outset position, in which the actuation plate 29 that is movable on the pedal tappet 28 comes into engagement with the main cylinder pistons 12 and 13, at all points during operation, that is, during braking and anti-skid operation. The concept of the brake booster 1 with the travel simulator 36 enables the operative surface areas of the main cylinder pistons 12 and 13 to be smaller in size, because these pistons—in contrast to conventional boosters—are not coupled directly with the pedal tappet 28. It is accordingly possible to reproduce the known jump in translation thereby, with the result that in the event of a failure of the energy supply, greater pressure can be attained with relatively small pedal forces.

The smaller dimensioning of the pistons 12 and 13 also has advantages in terms of the dimensioning of the restoring springs 48 and 49, since the latter can be designed for smaller pressures, because the pedal forces a normal driver may be expected to exert do not result in higher braking pressures. For example, the law in the present type of failure prescribes an auxiliary braking effect of virtually 30%, which in medium-heavy vehicles necessitates braking pressures of approximately 40 bar. According to European regulations, a pedal force of 500 N is associated with this auxiliary braking effect. The displacement of the main cylinder pistons 12 and 13 when the pressure supply is intact has the result that in the event of pressure modulation for the anti-skid function, the main cylinder pistons 12 and 13 are located outside the operative range of the pedal tappet 28.

When the main cylinder pistons 12 and 13 have the dual function of both pressure buildup in the brake circuits I and II and pressure variation for the anti-skid system, minimum expenditure is required for the anti-skid function. The braking medium for both the brake circuits I and II and for the pressure supply apparatus 58 is the same, although it may instead be different.

DESCRIPTION OF THE OPERATION OF THE ANTI-SKID SYSTEM

The brake pressure P fed into the system by the control valve 39 travels via the anti-skid apparatus 5 via the 3/2-way valve 11 and the 2/2-way valve 10 to the primary side of the main cylinder pistons 12 and 13. Respective 2/2-way valves 6, 7 and 8, 9 are disposed on the secondary side in the closed brake circuits I and II. The pressure reduction is effected via the 3/2-way valve 11 disposed on the primary side, which causes pressure medium to flow out of the control chambers into the return line. The parallel-connected 2/2-way valve 10 is closed during the operation of the anti-skid apparatus. The passage through the 3/2-way valve 11 is throttled, with the result that during braking a higher speed of pressure increase prevails than during anti-skid operation, because of the larger cross sections involved. This is the phenomenon of "pressure gradient switchover". The 2/2-way valves 6, 7 and 8, 9, respectively, disposed on the secondary side each serve to maintain pressure. Between the valves 10 and 11 is a check valve, which enables a rapid reduction of braking pressure if the braking pressure is reduced by the driver while the anti-skid system is in operation.

The control valve 39 of the brake booster 1 is geometrically dimensioned such that if the pressure supply fails the control valve moves toward the stop and connects the hydraulic conduits acted upon by the control pressure P with the return line.

Figure 2:
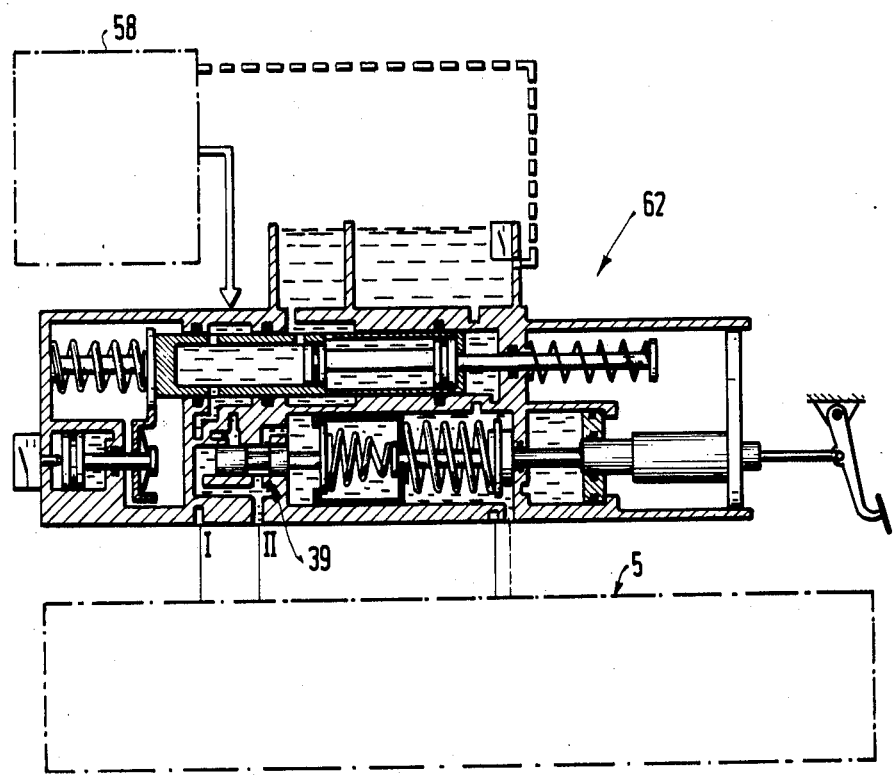
FIG. 2 shows a hydraulic brake booster having one closed brake circuit and one open brake circuits.

The brake booster 62 shown in FIG. 2 has a similar design to that shown in FIG. 1, except that here an open brake circuit II is provided, which is supplied directly by the control valve 39. Identical elements are therefore identified by the same reference numerals. Just as in the exemplary embodiment of FIG. 1, the brake circuit I is a closed brake circuit, having the main cylinder configuration used in that embodiment.

Figure 3:
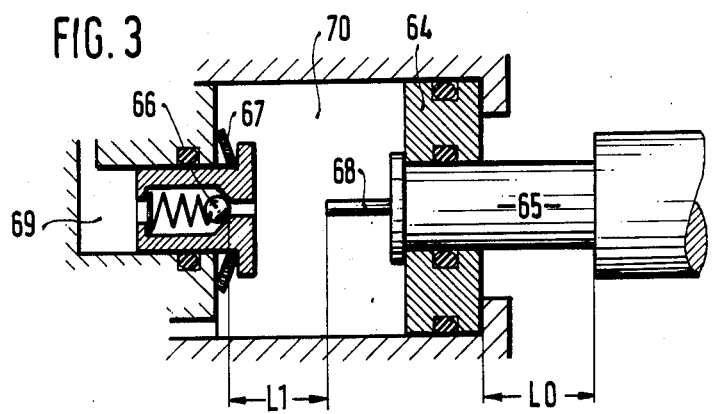
FIG. 3 shows a modification of a detail of the pedal tappet.

FIG. 3 shows a special disposition of the annular piston 34 described in connection with FIG. 1. Here this element is identified by reference numeral 64 and has the task of limiting the travel of the pedal tappet when the pressure supply is intact. The intent is that, as much as possible, the pedal tappet 65 be arrestable at large pedal forces down to a relatively low reservoir pressure level of 60 bar, which means a corresponding effective surface area of the annular piston 64. This has advantages in terms of utilizing the reservoir 60, and also avoids high pressures in the reservoir 60. On the other hand, an overly large effective surface area without additional provisions would eliminate the above-mentioned advantage of the jump in translation, because the volume positively displaced by the annular piston 64 will reach the rear side of the main cylinder pistons 12 and 13 in the event of pressure supply failure.

In this structure according to FIG. 3, a ball valve 66 is inserted as a relief valve on the other side of a work chamber 70; in cooperation with a plate spring 67, this ball relief valve 66 is deflected in proportion to the control pressure. If the control pressure is limited as a consequence of low reservoir pressure, then an insufficient deflection will take place, with the result that after a stroke L1 has been executed, the tappet extension 68 connected to the pedal tappet 65 will push open the ball valve 66; the result of this, in turn, is that the control pressure drops, because the following chamber 69 is joined to the return line. This opening action is executed at a pressure P < 100 bar.

In any event, the use of the above-described additional ball valve 66 dictates that the travel simulator 36 be disposed externally, as contrasted with the disposition shown in FIG. 1, because the annular piston 34 and the travel simulator 36 there are in the same axis.

Figure 4:
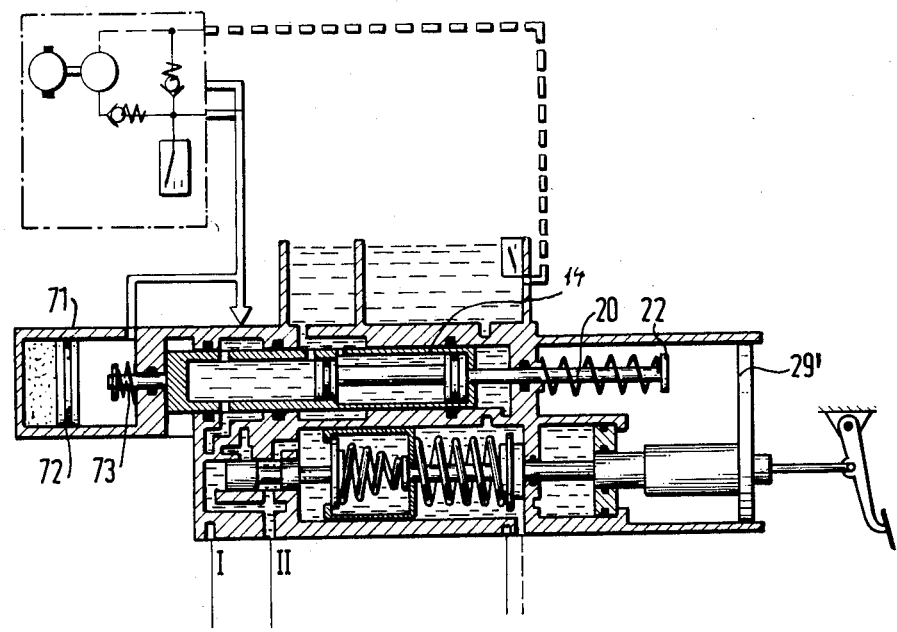
FIG. 4 shows a modification of the structure according to FIG. 2.

FIG. 4 shows a variant of the structure of FIG. 2. Here, a simple piston accumulator 71 is used, which with a reservoir pressure operating piston 72 can influence a tappet 73 such that if the reservoir pressure of the pressure supply apparatus fails, the main cylinder sleeve 14 is pressed into its right-hand terminal position, in which the rod 20 rests with its head 22 on an actuation plate 29'. In this embodiment, the piston accumulator 71 accordingly serves directly as a restoring means for the sheath 14.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake booster for a vehicle brake system, having a pressure supply apparatus comprising a pump and a reservoir, further having a control valve in a housing which monitors both a connection between the pressure supply apparatus and at least one main cylinder and a connection between the main cylinder and a relief location, and having a pedal-moved actuation plate, which is spaced apart from one end of a main cylinder piston, and having a reservoir pressure operating piston subjected to the reservoir pressure, characterized in that said at least one main cylinder is provided with a sleeve operable in a cylinder into which the main cylinder piston is inserted, and that said sleeve is exposed to an adjusting force which can be applied in a direction of said actuation plate by a restoring force spring and in the opposite direction therefrom by a restraining force of the reservoir pressure operating piston.

2. A hydraulic brake booster as defined by claim 1, in which the sleeve receiving the main cylinder piston is retained against a stop in the main cylinder housing by the restraining force of the reservoir pressure operating piston.

3. A hydraulic brake booster as defined by claim 2, in which said stop is embodied by the free end of a stop pin, which is inserted into said housing of the brake booster and is centrally surrounded by said restoring spring.

4. A hydraulic brake booster as defined by claim 1, which includes two main cylinders, each controlling one closed brake circuit in which one brake medium is used for both brake circuits and said pressure supply apparatus.

5. A hydraulic brake booster as defined by claim 2, which includes two main cylinders, each controlling one closed brake circuit in which one brake medium is used for both brake circuits and said pressure supply apparatus.

6. A hydraulic brake booster as defined by claim 3, which includes two main cylinders, each controlling one closed brake circuit in which one brake medium is used for both brake circuits and said pressure supply apparatus.

7. A hydraulic brake booster as defined by claim 1, which includes two main cylinders, each controlling one closed brake circuit and that different brake mediums are used for different brake circuits and for the pressure supply apparatus.

8. A hydraulic brake booster as defined by claim 2, which includes two main cylinders, each controlling one closed brake circuit and that different brake mediums are used for different brake circuits and for the pressure supply apparatus.

9. A hydraulic brake booster as defined by claim 3, which includes two main cylinders, each controlling one closed brake circuit and that different brake mediums are used for differeht brake circuits and for the pressure supply apparatus.

10. A hydraulic brake booster as defined by claim 1, which includes two main cylinders, one of which is located in a closed brake circuit and one is located in an open brake circuit.

11. A hydraulic brake booster as defined by claim 2, which includes two main cylinders, one of which is located in a closed brake circuit and one is located in an open brake circuit.

12. A hydraulic brake booster as defined by claim 3, which includes two main cylinders, one of which is located in a closed brake circuit and one is located in an open brake circuit.

13. A hydraulic brake booster as defined by claim 1, in which said reservoir pressure operating piston is combined with an intermediate spring, upon the compression of which an additional stroke of said reservoir pressure operating piston is possible.

14. A hydraulic brake booster as defined by claim 4, in which said reservoir pressure operating piston is combined with an intermediate spring, upon the compression of which an additional stroke of said reservoir pressure operating piston is possible.

15. A hydraulic brake booster as defined by claim 7, in which said reservoir pressure operating piston is combined with an intermediate spring, upon the compression of which an additional stroke of said reservoir pressure operating piston is possible.

16. A hydraulic brake booster as defined by claim 10, in which said reservoir pressure operating piston is combined with an intermediate spring, upon the compression of which an additional stroke of said reservoir pressure operating piston is possible.

17. A hydraulic brake booster as defined by claim 13, which includes a switch inserted into a work path of said reservoir pressure operating piston which switch controls a switching circuit of the pressure supply aparatus or a warning device.

18. A hydraulic brake booster as defined by claim 1, which comprises a travel simulator, a brake pedal, said actuation plate, a pedal tappet, and an intermediate spring inserted between said pedal tappet and said travel simulator.

19. A hydraulic brake booster as defined by claim 17, in which said pedal tappet includes a stop shoulder which operates relative to an annular piston by which a stroke of the brake pedal can be limited when the pressure supply is intact.

20. A hydraulic brake booster as defined by claim 19, in which said annular piston defines a work chamber subjected to and includes a tappet extension and that said work chamber includes a relief valve which after a certain stroke (L1) of said annular piston said relief valve can be pushed open by said tappet extension.

21. A hydraulic brake booster as defined by claim 1, in which said reservoir pressure operating piston forms a piston of a piston-accumulator and produces a restoring force for said sleeve.

* * * * *